May 15, 1951  J. T. McGARRY  2,552,729
WATER SERVICE APPARATUS
Filed June 9, 1944  4 Sheets-Sheet 1
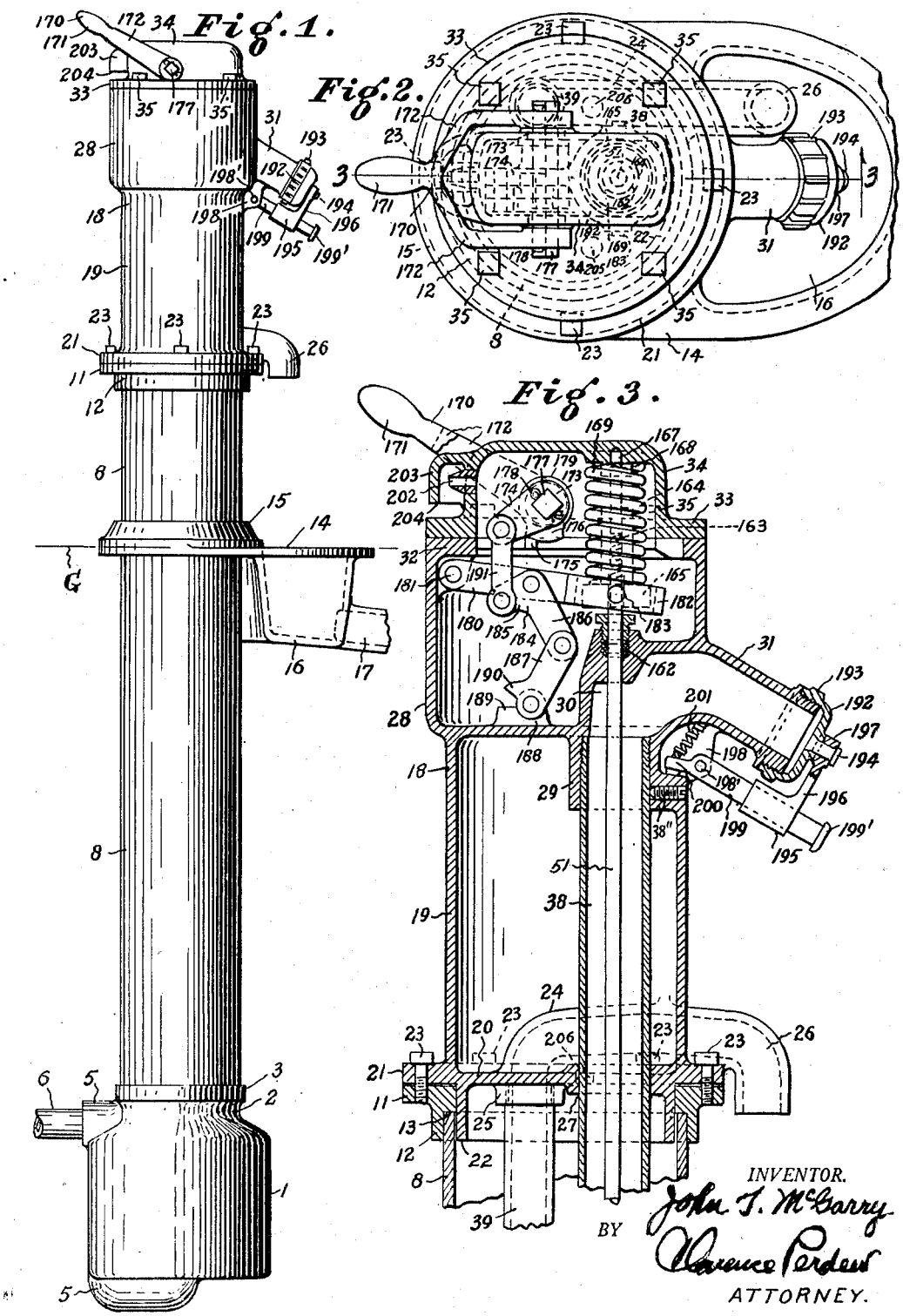
INVENTOR.
John T. McGarry
BY Clarence Perdew
ATTORNEY.

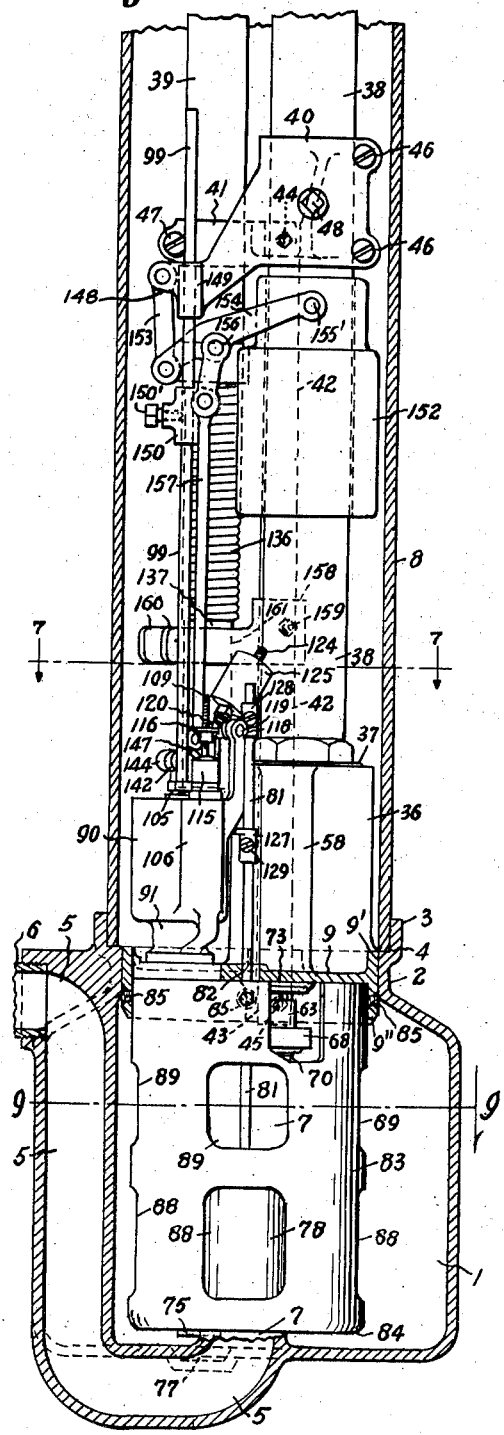

May 15, 1951 J. T. McGARRY 2,552,729
WATER SERVICE APPARATUS
Filed June 9, 1944 4 Sheets-Sheet 3

INVENTOR.
John T. McGarry
Clarence Perdew
BY
ATTORNEY.

May 15, 1951  J. T. McGARRY  2,552,729
WATER SERVICE APPARATUS
Filed June 9, 1944  4 Sheets-Sheet 4
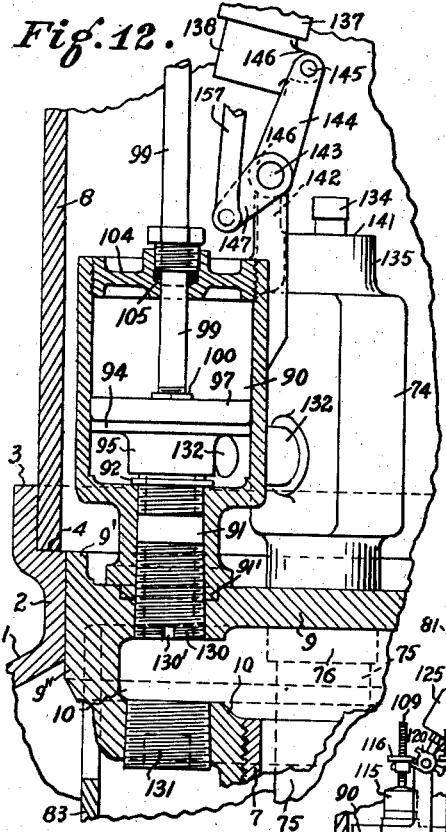
Fig. 12.
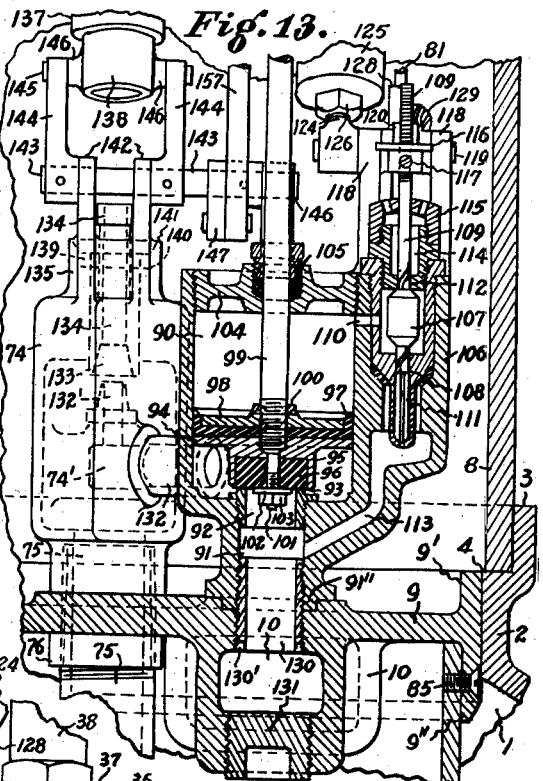
Fig. 13.
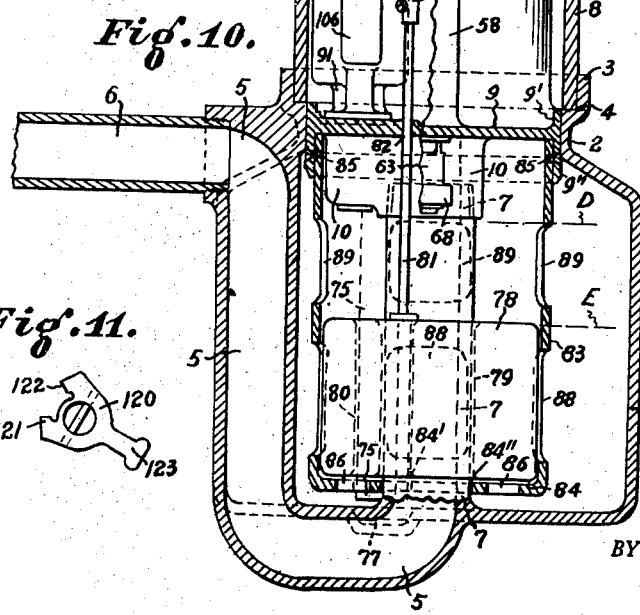
Fig. 10.
Fig. 11.
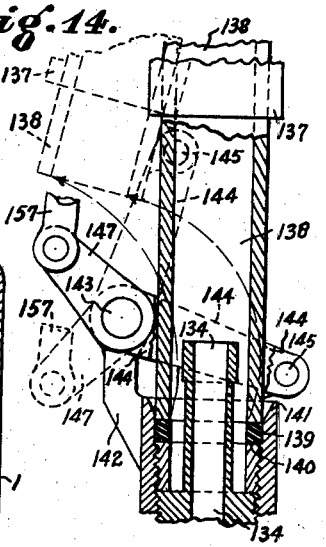
Fig. 14.
INVENTOR.
John T. McGarry
BY
ATTORNEY.

Patented May 15, 1951

2,552,729

UNITED STATES PATENT OFFICE 2,552,729

WATER SERVICE APPARATUS

John T. McGarry, Cincinnati, Ohio; Mary Frances McGarry, executrix of said John T. McGarry, deceased, assignor to Railroad Products Company, Cincinnati, Ohio, a corporation of Ohio Application June 9, 1944, Serial No. 539,544

10 Claims. (Cl. 137—13)

My invention relates to hydrants and the like, and more especially to such apparatus so exposed as to require precaution against freezing, and to require drainage of the residue of water in the riser after each taking of water. The present invention is an improvement on my invention disclosed and claimed in my copending application, Serial No. 524,392, filed February 29, 1944; and like it has as an object the avoidance of connection of the riser drainage means with a sewer or other receptacle for the drainage from which the riser and other parts contacted by the potable water might be contaminated. Apparatus is known in the art wherein the residue, received in the reservoir of the apparatus, is forced out through the riser with the potable water flowing therethrough at the next use of the apparatus. To avoid passing the reservoir water through the riser is a further object had in common with the invention of the above mentioned application. This is because the reservoir water, standing in a long interval between uses of the apparatus, may become too stale, and may collect impurities.

Contrary to that, the object is to force the water directly from the reservoir to the exterior of the apparatus, into a drain or any other suitable place of disposal of the drained water. A further object is to provide improved means whereby the water from the main forces the drained water from the reservoir, governed to act after water has reached a cetrain height therein safely below the level of the riser drain outlet so that the drain water or any other water chancing to enter the reservoir cannot enter and risk contamination of the riser, from which the potable water obtained through the riser might become polluted.

A further object is to provide the control device for water-operated forcing means, of improved construction for better responsiveness to the rise and fall of the water while controlling the rather heavy pressure of the water from the main. A preferred forcing means for expelling the reservoir water is an aspirator which directs its jet upward into a discharge pipe taking water from the reservoir under the force of the jet discharge and conducting the water up out of the apparatus to the exterior thereof above the ground level and with its outlet safely separated from the sewer, cesspool or other ultimate destination of the expelled water. In this use of the aspirator my present invention resembles that of my prior application before mentioned; but herein I provide against occasions when there may be a contamination of water in the main by reservoir water which might enter the main through the aspirator where it receives its forcing water from the main, in case of any degree of vacuum in the main, as will be more fully set forth hereinafter in a preferred example.

A further object is the simplification of the construction in general in proportion to the functions preformed, and the making of the construction more compact, with saving of material and reducing the weight having to be handled in servicing the apparatus. Further objects are better to insure against leakage of ground water into the apparatus; to increase the reliability of the apparatus and reduce the amount and frequency of servicing required, with more independence of the thoughtfulness of the operators; notably by minimizing the use of gaskets and the like, especially in the underground structure of the apparatus, with improved construction permitting minimum use of such junction means and facilitating all metal construction instead; and of springs and their liability to break, by improved construction facilitating the use of weight means instead. A further object is to provide better means for venting the necessary flows of water, with a minimum of admittance of foreign matter, both in the interest of sanitation and in the maintenance of efficiency. Other objects will appear in the course of the following description, illustrated in the accompanying drawings, in which:

Figure 1 is a side elevation of the entire apparatus, on a much reduced scale, with no interior parts indicated, so as to afford a very clear illustration of the exterior appearance.

Fig. 2 is a plan view of the apparatus on a larger scale, a portion being broken away for lack of space;

Fig. 3 is a vertical section of the upper part of the apparatus, on the plane of the line 3—3 of Fig. 2, on same scale;

Fig. 4 is a vertical section on same plane and scale as Fig. 3, of the lower part of the apparatus;

Fig. 5 is a vertical section of a lower portion of the apparatus including the riser outlet means, on a further enlarged scale and on the plane of the line 5—5 of Fig. 7;

Fig. 6 is a detailed plan view of the riser outlet valve;

Fig. 10 is a vertical section on same scale, especially illustrating the float, the guard and the reservoir, and the controlling means and the float relation thereto, at different stages of operation of the apparatus;

Fig. 11 is a detailed side elevation of the rocker forming part of the float-operated controlling means;

Fig. 12 is a fragmentary vertical section on the plane of the line 12—12 of Fig. 7, on the scale thereof, especially illustrating the controlling means and aspirator and their operative relation to each other;

Fig. 13 is a like illustration, being a vertical section on the line 13—13 of Fig. 7, with more detailed disclosure of the controlling means; and Fig. 14 is a schematic vertical section of the top part of the aspirator and bottom part of the discharge pipe, on a scale larger than that of any preceding view, clearly to show the operative relation of these parts.

Figure 7:
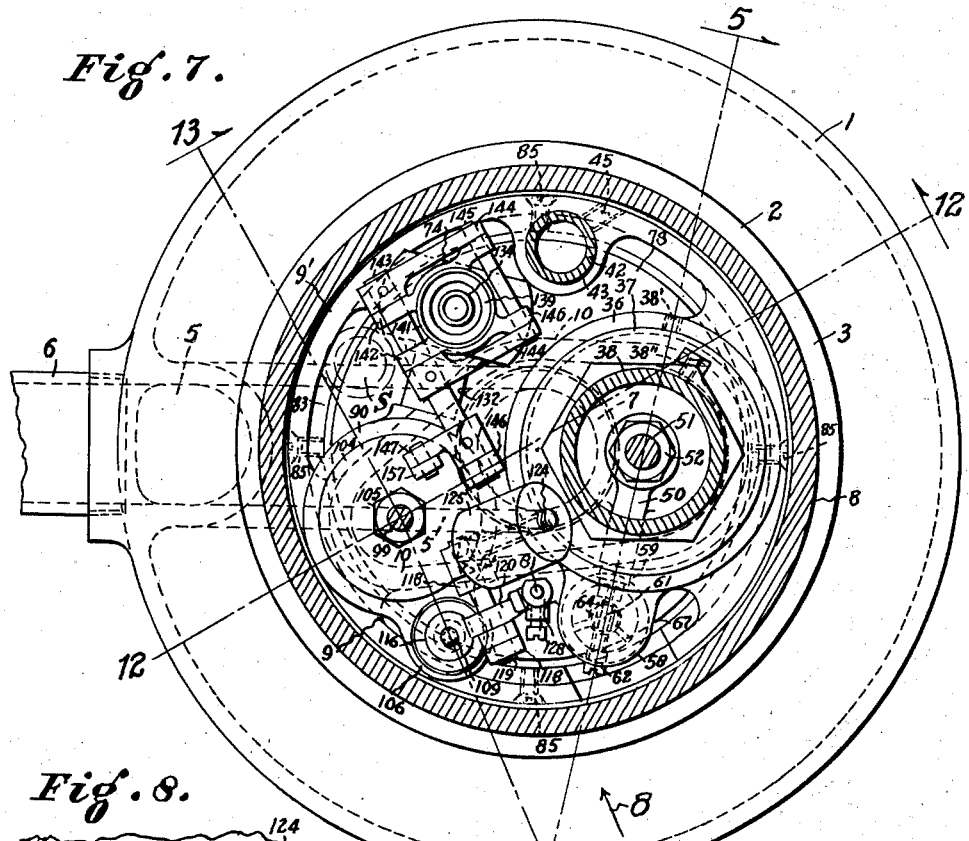
Fig. 7 is a sectional plan view on the enlarged scale of Fig. 5 and on the horizontal plane of the line 7—7 of Fig. 4.

In the preferred example herein illustrated, the reservoir 1 is an upright cylinder with a top contracted neck 2 which has an outset annular upstanding flange 3 around an annular shoulder 4, down from which, for a suitable distance, the interior of neck 2 is accurately cylindrically finished. At one side of neck 2 is a boss having a laterally opening interiorly threaded upper end of a conduit 5 into which screws the pipe or main 6. This conduit 5 extends down inside the reservoir, then radially inward below the generally flat bottom, to continue upward as the pipe 7 at the center of the reservoir. The top end of pipe 7 is exteriorly threaded accurately concentric with the finished interior of neck 2 above described.

The casing 8, which may be a suitable length of standard pipe or tube, has its bottom end part fitting within neck flange 3 and on shoulder 4, where it is permanently connected to the reservoir, to be water-tight, as by welding, or brazing or the like. It is in the lower part of this casing 8 that the several devices are located for controlling and causing flows of water while protected from freezing. All of these devices are supported on a bottom plate 9 which has on its bottom the distributing conduit 10 with an opening in its lower wall threaded to screw onto the top end part of the reservoir central pipe 7; the threads being tapered to draw together in a water-tight relation. Plate 9 peripherally has upwardly and downwardly extending flanges 9' and 9'' like a pulley rim; and these are finished accurately to have a very close turning fit in the cylindrically finished interior of neck 2, before described, and which is accurately concentric with the thread connection of the plate 9 with the pipe 7, to act as a guide as plate 9 is screwed onto pipe 7, and to stabilize the plate on this pipe 7, which is the support for the plate and the devices on it.

It will be understood that the required distance of the devices to be protected from freezing, below the ground level G, is variable in various installations, determined by the climate at the respective location. The casing 8 and reservoir 1 at its bottom, permanently united as before mentioned, are permanently embedded in the ground with the connected main 6; and the casing 8 is continuous in its extent to a considerable distance above the ground level G as seen in Fig. 1. As there seen, and also seen in Fig. 3, a top ring 11 is like the reservoir neck 2 but inverted, with the annular flange 12 and annular shoulder 13, receiving the top end part of the casing 8, where the ring 11 is welded or brazed to the casing. At ground level G is the ground plate 14 having a ring part 15 surrounding casing 8 and welded or brazed thereto, preferably, and a depending basin 16 having a drain pipe connection 17 from which a connected drain pipe, not shown, will be understood to lead underground to any desired place of final disposal of water received by the basin 16. Where the ground surface G is of concrete or the like the plate 14 may be embedded therein so that its top surface is in the plane of the ground surface, with ring part 15 extending above for finished appearance, as is clear in Fig. 1.

The ample extension of casing 8 above ground level G, with no opening in the casing walls anywhere, insures against entrance of ground surface water into the casing, unless such water reaches flood depth, far greater than any surface flow incident to even severe storms. Thus the space in the casing containing the devices that must control flow of fresh and clean water is kept so reasonably clean that tendencies to damage the devices by ground surface substances practically are eliminated, allowing these devices to remain highly efficient in their function of control with separation at all times of clean water and drainage water as will later be fully described. The widened reservoir 1 affords a firm footing for the entire structure, as well as a firmer anchor for it; and it will be understood that reservoir 1 may be of increased width proportionate to the diameter of casing 8, rather than deepened if it is to be of greater capacity for reasons later to be mentioned.

A generally cylindrical shell 18 comprises the lower portion 19, the floor portion 20 of which has an extended external flange 21 resting on top of casing top ring 11, and a depending flange 22 fitting the interior of ring 11. Flange 21 and ring 11 are finished to fit together closely; and flange 22 has a close turning fit in the ring interior and is deep enough to afford a guide for aligning the threads of pipe 7 with those of the distributor 10 (Fig. 12). Screws 23 through flange 21 and ring 11 rigidly connect shell 18 to casing 8. Integral with the floor part 20 is the conduit 24 with its inlet through a boss 25 at one side of the center of the shell and leading across on this side to continue through the shell wall and end as a spout 26; all of these parts being integrally formed. Also close to the shell wall where the spout is formed the floor part 20 has an opening 27 through a boss formed on the floor.

The shell upper portion 28 has the opening 29 in a boss depending from its floor, and has the conduit 30 leading up from the opening and continuing out through the shell wall and ending in the main spout 31. All of these parts are integrally formed. The top rim of upper portion 28 has the annular inwardly extending flange 32. The cover comprises a lower disk 33 of the diameter of the upper shell part 28, and, integral with the disk part, a housing 34 symmetrical to the disk center, of oblong shape generally, and of considerably less transverse dimensions than those of the disk part 33, which fits on top of flange 32 of portion 28, these parts fitting closely together. Screws 35 through these parts secure the cover in place. It has been noted that chances of ground flow reaching higher than the top of casing 8 are small; and the joints between shell 18 and the casing 8 and between cover disk part 33 and the shell are exposed, at worst, only to driving rain; so that gaskets may be omitted, if the meeting surfaces are sufficiently accurately fitted. Such fitted surfaces may be coated with some substance that will harden and be water resistant as a sealing substance, such as white lead. The bottom plate 9, as later will be made clear, is not required to make water tight separation of the interior of casing 8 from reservoir 1; so that the bottom plate flanges 9' and 9'' fitting in the reservoir neck 2 need only a similar coating.

To have alinement with the opening 27 in the bottom of shell 18 and with the opening 29 in the floor of the shell upper part 28, an upright cylindrical barrel 36 integral with the bottom plate 9 as best seen in Fig. 5, has its top formed by a ring-shaped plug 37 screwed into the barrel upper rim with a tapered water tight fit. This plug receives in the same manner in its threaded interior the lower end part of the riser 38, which may be a standard pipe or tube continuous up through the bottom opening 27 of shell lower portion 19 and into opening 29 in the floor of shell upper portion 28, with a tapered thread connection, and hence into communication with main spout 31. As tapered threads are used at both ends of the riser, the assembly of bottom plate 9, shell 18 and riser 38 is made by first screwing riser 38 into the shell 18, and then screwing bottom plate 9 onto the riser by turning this bottom plate around the riser; it carrying with it such devices as may have been mounted upon it.

With such riser connection of the bottom plate 9 and the upper parts there may be relative twisting of the connected parts, and the riser will sustain the entire strain of bending when the assembly is handled. The discharge pipe structure, previously mentioned, is utilized to make a second connection between plate 9 and shell 18, preventing relative turning and allowing the riser 38 and this structure to afford mutual reinforcement against bending of either in the above circumstance. The main upper portion 39 of the discharge pipe has its top end part screwed into the inlet opening of conduit 24, in the floor part of shell lower portion 19, with a tapered thread. This discharge pipe portion 39, which may be a standard pipe or tube, ends a considerable distance up from bottom plate 9, in the construction later to be more fully described. Additionally, as part of other later described structure, a yoke 40 embraces riser 38 with an extension 41 that embraces discharge pipe portion 39 near its bottom end. This extension 41 also has a hub embracing the top end portion of a post 42, which may be a piece of standard pipe, having its bottom end part firmly fitted in a socket 43 in bottom plate 9, as best seen in Fig. 4. This assembly of discharge pipe portion 39 and post 42, with yoke 40 and riser 38, completes a rigid frame-like structure along with the upper shell 18. This structure supports all of the working parts of the apparatus and may bodily be lowered into the casing 8 to working position of the parts, or withdrawn upward from the casing for inspection, and such adjustment and repair as may be needed. As shown, the connections of post 42 to yoke 40 and bottom plate 9 are fixed by means of set screws 44 and 45 respectively, after discharge pipe portion 39 has been screwed into shell bottom opening 29; while the yoke 40 has split hubs by which it clamps around riser 38 and discharge pipe portion 39, with screws 46 and a screw 47, respectively. The yoke 40 is slipped onto riser 38 before it connects shell 18 and plate 9. A set screw 48 in one side of the yoke hub is made to indent riser 38 after location of yoke 40 thereon. A set screw 38' locks the plug 37 and set screws 38'' lock the riser 38 from unscrewing when the plate 9 is unscrewed from pipe 7.

Such a unit, made up of bottom plate 9 and shell 18 and connecting parts, together with the devices carried by the unit, may be connected watertight to the main 6 through reservoir duct pipe 7, by turning the unit as a whole, guided at reservoir neck 2 and at top casing ring 11, to screw accurately onto pipe 7 until the tapered threads are amply tightly fitted to be water tight; the operation for withdrawal of the unit being simply a reverse turning. It has been common practice in hydrant construction to use some kind of gasket, packing or other non-metallic means to make detachable connections corresponding to the ones described. The tapered screw threads add greatly to the reliability and to the ease of maintenance of the apparatus, being subject to almost no deterioration.

The barrel 36 integral with and upstanding on bottom plate 9 accommodates main valve 49 with diameter to allow ample ease of flow of the water up around this valve when it is open. This main valve 49 comprises the integrally formed downwardly opening cup, a hub upstanding from the cup, and an arm 50 projected laterally from the cup and hub. The bottom end part of the operating rod 51 screws into the hub with a lock nut 51 against the hub top, and extends up centrally through the riser 38. The cup part has a central depending stem 53 around which the packing or gasket ring 54 fits closely as it does also within the cup walls. It is held up by a washer 54' and two nuts 55 and 55' screwed on the bottom end part of stem 53. Down in a threaded opening in plate 9 that enters the distributing conduit 10 is screwed the seat ring 56 with tapered threads and presenting upwardly the annular seat 57 for the main valve packing ring 54 when the valve is lowered. Raising valve 49 admits water from conduit 10 to riser 38 to flow upward therethrough and out of main spout 31 previously described.

This construction of valve means is broadly well known, as is one in which the valve seats upwardly and which is suspected of causing water hammer in connections to the apparatus more than is the downwardly seating valve 49 herein. However, I am not limited to this disclosure, and may employ an upwardly seating valve.

Upon opening the main valve 49, the riser should be closed against escape of any water except by way of spout 31; but with closing of this valve all of the residue water in the riser should be allowed to escape and not stand in the apparatus to become stale and warm, and possibly contaminated, and, in the upper part of the riser, to freeze in cold weather and clog the riser and hold rod 51 and so prevent operation of the valve. A simple side opening and a sleeve sliding with the main valve to close and open the opening have been extensively employed. Difficulty of reliably gasketing a sleeve usually has resulted in relying simply on its mere close sliding fit in the riser; and the necessary height of the sleeve, which must come below the outlet to open it, compels this outlet to be so elevated that considerable water, which is residue, is retained in the riser, contrary to the purpose to have no standing residue in intervals between taking water from the apparatus. These objections are herein avoided by having a drain valve at a side of the riser, a reduced replica of the main valve but opening downwardly whereas the main valve opens upwardly. The arm 50 of the main valve is part of this improved construction.

Thus, small cylinder 58, vertical on one side of barrel 36 and integral therewith, has the vertical slot 59 through the barrel wall, admitting arm 50 to the cylinder. The valve head 60 slides up and down in the cylinder as engaged by arm 50 in a side recess of the head. A screw 61 through the head into arm 50 fixes the two members together. This screw is sunken to avoid contact with the cylinder wall which has an opening through which the screw may be inserted in making assembly; this opening is closed by a tapered screw plug 62. The valve shank 63 below head 60 likewise slides in the cylinder with a threaded stud 64 screwing up into the bottom part of head 60. It is clamped by a small screw 65 in a side of head 60; the cylinder wall having a second opening for inserting this screw when assembling, which is closed by a second tapered screw plug 66. The head of small screw 65 also is sunken in the shank, away from the cylinder wall.

The upper portion of shank 63 is fluted to leave fins 67 as guides, while the lower end part is fully cylindrical and receives on its bottom the drain valve 68, which is an upwardly opening cup containing the gasket ring 69 and holding it up against the bottom of shank 63. A screw 70 extending up through the cup bottom and the gasket ring and threaded into the shank, with a lock washer 71 for the screw, holds these parts together. The seat ring 72 is screwed, with tapered thread, up into the opening in plate 9 at the bottom of cylinder 58 and has the downwardly facing annular seat 73 for the drain valve gasket ring 69.

The stud 64 permits adjustment so that the seating here is correct when main valve 49 is in topmost position as determined by its operating mechanism later to be described. It will be seen, especially in Fig. 5, that entrance through slot 59 to the cylinder from the barrel 36 is possible entirely down to the bottom of the barrel, leaving no body of water in the barrel; and that the drain valve 68 is fully as effective for preventing escape of fresh water while the main valve 49 is open as is the main valve itself for stopping flow of fresh water when it is closed. The spaces between the fins 67 reach above and below the valve seat 73 when the drain valve is fully opened by complete closure of main valve 49, for ample free flow of the residue water from the riser and the barrel 36, quickly to empty the riser. This minimizes a chance of residue water freezing to any extent in the riser while too slowly flowing from the riser as may be the case with an opening of limited size in the prior sleeve valve construction above noted.

The aspirator, the body 74 of which only is mentioned at present, has the suction pipe 75 leading into its bottom by extending up through bottom plate 9 with a ring nut 76 screwed onto its threads below plate 9, which are a continuation of threads with tapered fit in the body bottom. This clamps the aspirator firmly in position on bottom plate 9. The suction pipe 75 leads up from the bottom of reservoir 1; its bottom end being over a depression 77 in the bottom allowing clearance below its end in this depression for free entrance of water under suction from the reservoir, down closely to its bottom. The suction pipe 75 thus is one of two upstanding pipes in the reservoir, the other being the central pipe 7 that conducts water from main 6 as before described.

The float 78 is cylindrical with upright axis, preferably of very thin sheet metal such as copper. It has the upright tubular cores 79 and 80 to surround the pipes 7 and 75, respectively; and it has fixed on its top the vertical operating stem 81 extending up through opening 82 in bottom plate 9 alongside control means to be described. As this stem 81 is not central of the float, and as the weights of the cores 79 and 80 are not symmetrically distributed, the float has some guidance, not so intimate as to involve too much friction, by the pipes and cores and the stem 81 in bottom plate 9.

The float 78, along with the other devices, is withdrawn up through casing 8, for access to service it. Being the lowermost device it is then most exposed, and in negligence the entire withdrawn assembly may be set down with the float as the support; in which case it would be crushed. Thus withdrawn, the float 78 has remaining only suction pipe 75 and its stem 81 guided in plate 9, for guidance and maintenance of its correct relation to the parts above plate 9. Also, it then can drop partly out of the apparatus. Therefore it has the guard 83 which is a cylindrical open-topped shell with a bottom 84. The float walls and guard walls are close together all around, so that the guard also acts as a guide for the float; while the guard bottom supports the float when the assembly is withdrawn. This guard 83 has its top rim fitting within the depending annular flange 9" of plate 9, with screws 85 through the flange into the guard rim. The guard 78 thus hangs on this support with its bottom 84 spaced up from the reservoir bottom, admitting water under the guard, which has in its bottom 84 the openings 84' and 84" for the suction pipe 75 and central pipe 7 respectively. This bottom also has the openings 86 and the guard walls have the openings 88 and 89. These bottom and wall openings admit water to the float, to act thereon.

It will be understood that any increase in size of the float and its guard, contrary to previous reference to the reservoir 1, is by increase of height and not of width, as the float and its guard must pass freely up through casing 8 as do the bottom plate 9 and all devices carried thereby. Sizes of those parts vary according to the amounts of water to be accommodated in circumstances later made clear. The deepening of the reservoir has a limit depending upon the suction power of the aspirator through the suction pipe 75.

The float 78, by its relatively weak action determines the opening and closing of a valve by force of high pressure water from main 6 through mutations of a small auxiliary valve by the float according to its elevation in the reservoir by more or less water therein; the high pressure operated valve admitting high pressure water from the main 6 to the aspirator or excluding this water, for operating the aspirator or not. The device involved in this operation, which generally is not novel and is shown in my copending application mentioned earlier herein, has heretofore been supplied by me for keeping water in a tank close to a desired constant level. For such duty, the float has a very short range of action in which a gradual approach to the action of mutation on the auxiliary valve is negligible. For the present duty, however, it is desirable, for the most effective use of the aspirator, not involved in the former use, to have a very sudden mutation accomplished by a very short terminal part of float travel up and down alike. Formerly, the device used a small spring actuating the auxiliary valve in one direction as gradually permitted to act by the float; having been set when the float actuated the auxiliary valve gradually in the reverse direction. For the sudden mutation, use of a spring will usually involve more complication than use of a weight; and it is a policy of the present invention not to use any spring in any structure underground and depending upon raising it through casing 8 for replacement of a spring if it breaks or otherwise becomes defective.

The control device as herein disclosed, for the above purposes, comprises the cylinder 90, as best seen in Figs. 12 and 13, vertical and connecting by its bottom neck 91 with the distributing conduit 10. In the top of this neck 91 is the valve seat ring 92, screwed therein by tapered threads, with upwardly facing annular seat 93. The control plunger 94 has the downwardly facing control valve 95, which is an inverted cup containing the gasket ring 96 to bear firmly on seat 93 when the plunger is lowered. A gasket cup 97 opens upwardly on top of the plunger plate 94, as held down thereon by clamp plate 98 screwed along with main plate 94, on the threaded bottom end part of plunger rod 99, as is a lock nut 100 against the top of the clamp plate 98. A reduced lower extension 101 of rod 99 extends down through gasket ring 96 with a washer 102 held by a nut 103 screwed on this extension. The cylinder has a top end or head 104 screwed into it with tapered threads; and this head 104 has centrally the stuffing box 105 for passage of plunger rod 99 up out of the cylinder.

The auxiliary valve chamber 106 projects from a side of the cylinder body, with its axis vertically parallel with that of the cylinder. Formed by an assembly of parts inside chamber 106 is the valve space containing the auxiliary valve 107 with stems 108 and 109 extending from its bottom and top ends, respectively, which ends are conical; the body of valve 107 being cylindrical with annular space around it for free passage of water either up to or up from a cylinder port 110 connecting the upper end part of the cylinder interior with the auxiliary valve space, and open to lower and upper bores 111 and 112, respectively, in which valve stems 108 and 109 respectively slide. Each stem has a helical groove for passage of water through the respective bore if the conical end of the valve 107 is unseated from the adjacent end of the respective bore 111 or 112. Lower bore 111 leads up from the upper end of the by-pass port 113 that leads from inside the neck 91 below the control valve 95 and hence directly from main 6 with the high pressure water. Upper bore 112 leads up into a plug cup 114 having a perforated cap 115 through which water may escape from above plunger 94 by way of cylinder port 110 to the exterior of the device.

The upper stem extends considerably above cap 115 with its upward extension threaded with the tappet 116 screwed thereon and clamped in its adjusted position by a set screw 117 on its hub. The tappet is circular because of its rotation for adjustment up or down on stem 109. Upstanding from the top rim of valve chamber 106 are posts having in their tops bearings 118 for a shaft 119 on which is fixed between the bearings a rocker 120 with two jaws 121 and 122 projected, respectively, below and above the tappet 116 with a spacing for delayed action on the tappet as the rocker is rocked. This rocker has, opposite from the jaws, a finger 123. At the inner side of the inner bearing 118 a shank arm 124 is fixed on shaft 119 and is threaded, having screwed onto it the cylindrical weight member 125, with a lock nut 126 for the radially inner end of member 125 to fix it in adjustment. The operating stem 81 of float 78 extends up alongside this mechanism, and has on it dogs 127 and 128 respectively below and above the rocker finger 123, adjustably held by respective set screws 129 in the dogs against the rod.

Figure 8:
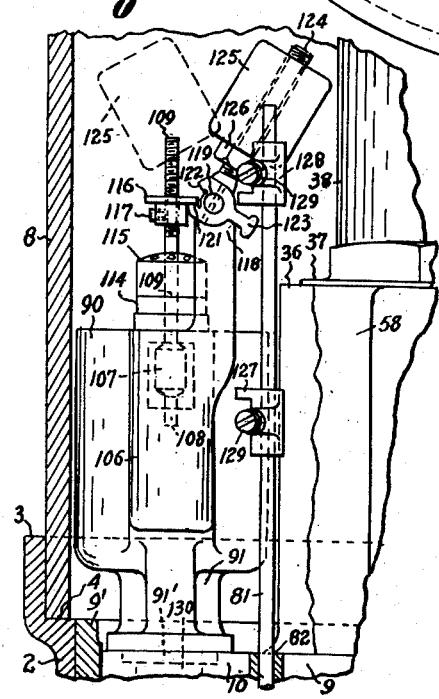
Fig. 8 is a fragmentary illustration viewing in the direction of the arrow 8 in Fig. 7, of a portion including the means that relates the float to the controlling means, on same scale.
Figure 9:
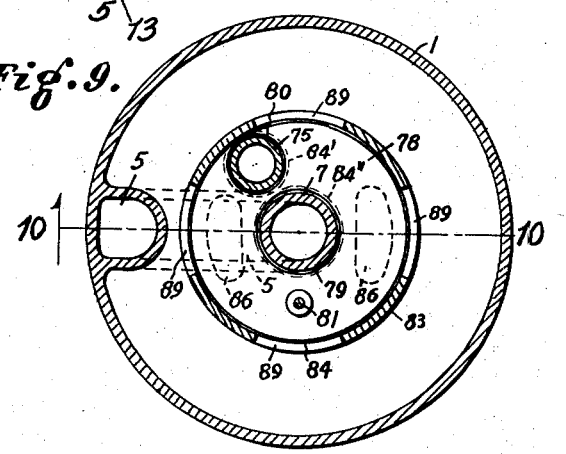
Fig. 9 is a sectional plan view on the medium scale of Figs. 2, 3 and 4 and on the horizontal plane of the line 9—9 of Fig. 4, to illustrate the float and its guard in the reservoir.

As illustrated, the parts are as they are positioned when reservoir 1 is empty and the control valve 95 is seated as shown. Having descended with float 78, upper dog 128 has pulled finger 123 down, rocking rocker 120 so that its has raised auxiliary valve 107, closing the upper bore and opening the lower one, in auxiliary valve chamber 106, so that high pressure water from main 6 flowed through by-pass port 113 and cylinder port 110 against the top of control plunger 94 with strong pressure to depress this plunger and seat valve 95. In reaching this result, upper dog 128 had rocked the rocker 120 and with it the weight member 125 from the broken-line position of member 125 in Fig. 8, gradually as the level of water in reservoir 1 fell, until weight member 125 had slightly passed vertical and leaned to the right far enough for gravity to cause it to tilt suddenly to its full right hand inclination as shown by the full lines and thereby cause rocker 120, by its lower jaw 121 to raise auxiliary valve 107 as above noted; so that the light float has operated the heavy control valve 95 to stop flow of water to the aspirator which was drawing the water from the reservoir, and confining the duration of withdrawal operation to just that needed to empty the reservoir.

Were water to flow into the reservoir 1 now, to the maximum height permitted, the float, rising, would raise its stem 81 and with it lower dog 127 gradually as the water rose, until in the latter stage of rise, dog 127, by finger 123, rocks the rocker 120 and weight member 125 to the left until member 125 has slightly passed vertical so that gravity suddenly tilts the parts, and upper rocker jaw 122 acting on tappet 116 suddenly moves auxiliary valve downward to close lower bore 111 and open upper bore 112. This excludes the high pressure water in by-pass port 113 and makes free the water above plunger 94. The high pressure water under control valve 95 now raises the valve and plunger 94, admitting the high pressure water to act on the large area of plunger 94 and pressing the water out from above the plunger by way of port 110 and open upper bore 112, while high pressure water flows to operate the aspirator. Thus in either case, once the relatively light float and auxiliary valve mechanism determine flow of the high pressure water, this water, acting on the relatively great area of plunger 94, can act powerfully not only for opening and closing control valve 95, but for other duties as later will appear. In Fig. 10, broken line D indicates top level of the float when the water has reached maximum permissible height; and broken line E indicates the same when the reservoir is empty; these indications corresponding to the stages of operation just above described.

In the compact assembly preferred, and herein illustrated, the control cylinder 90 and its associated parts cannot be rotated for screwing its bottom neck to a nipple through plate 9 to conduit 10 in the usual way. Accordingly a preferred connection comprises an upwardly tapered nipple 130 that is inserted through an opening in the bottom wall of conduit 10 which is afterward closed by a tapered plug 131. Neck 91 has an annular downward extension 91' snugly fitting a socket in plate 9 around the opening thereof into conduit 10, holding the neck interior and this opening alined, while these are tapped simultaneously to receive the tapered nipple 130; the cylinder 90 being turned not quite to its final position so that the nipple connection can be tightened when it is made after the tapping. The nipple 130 has a kerf 130' for engagement to screw it into place as reached through the conduit lower wall opening.

The aspirator has herein above been partly described as having the body 74 and the suction pipe 75 with the ring nut that clamps it to the plate 9 where the suction pipe 75 extends through the opening in the plate 9. The aspirator connects to the control cylinder 90 by the supply pipe 132 leading from the space near the control valve seat and below the lowest travel of plunger 94. It is desirable to make the connection of the two devices by this pipe 132 before assembling either of them on plate 9; for which the inplace tapping an insertion of the nipple 130 as just before explained has special advantage. The aspirator preferred and herein illustrated is of well known make as far as concerns its basic operation; and it is deemed that the dotted representation of its interior in Fig. 13 will suffice.

Here is shown the entrance conduit 74' across the body 74, which is of oblong cross section, the way of the narrower dimension; so that the wider dimension leaves at each side of this conduit 74' passages for the liquid upward from the suction pipe 75, to the upper part of the body interior where there is the jet nozzle 132' leading up from the top side of conduit 74' to discharge into the skirt 133 which is the bottom end of the discharge tube 134 leading up through the upper neck 135 of the body 74 and thereabove a proper distance. The supply pipe 130 enters the conduit 131 delivering the high pressure water admitted by open valve 95 through the jet nozzle 132' to create the partial vacuum resulting in atmosphere in reservoir 1 forcing the reservoir water up through suction pipe 75 to mingle with the jet water the more intimately in discharge tube 134. Ordinarily, the discharge pipe, through which the aspirator is to deliver the water to a higher location would simply be in fixed connection with the upper neck 135 and the discharge tube would discharge up into this discharge pipe.

Consideration has been given, however, to the slowness of drainage back into the reservoir of the residue in the discharge pipe after the aspirator stops lifting the water, with no freer passage than that afforded down through the aspirator discharge tube 134 past the jet nozzle 132' to the suction pipe 75. So, in my mentioned prior application I provide the lower part of the discharge pipe with a wide-opening valve controlled by the aspirator control valve, to open when the aspirator stops and to close when it starts.

I here provide for complete avoidance of flow of any residue or other doubtfully clean water into the aspirator whence it might get into the main, as well as for the just mentioned quick release of the water backflowing from the discharge pipe. The contingency that unclean water may get into the main is due to the liability that through some abnormal condition in the water works main, of which main pipe 6 is a branch, there is a partial vacuum in the main. For instance the main may have a break or leak, even at a long distance from my apparatus; so that the water in the main instead of exerting its usual heavy pressure toward the apparatus, flows away therefrom and out through the break or leak, leaving a vacuum in its wake in communication with the control device neck 91.

With the vacuum in the main, the pressure through by-pass port to hold control valve 95 seated fails. In previous control devices of the same general type, a spring in cylinder 90, pressing down on control plunger 94, has aided the high pressure water to close the valve 95, mostly in the initial stage while the water is establishing its high pressure on the plunger. It has not been designed, however, to have such force as to be reliable in holding valve 95 closed, even were its condition above suspicion, with the firmness by which the valve would prevent the backflow under suction of vacuum in the main. Besides, it is the policy at present not to trust any valve not to be leaking. Elevating the aspirator out of the reservoir water requires more powerful suction through pipe 75, but eliminates a constant liability of contamination in case of vacuum in the main. In my mentioned co-pending application I disclose such elevation of the aspirator, as of course I do in this present application.

But if the vacuum in the main occurs while the aspirator is discharging, there will be a head of reservoir water up in the discharge pipe, which in time would flow down to the aspirator and hence past an infirm control valve 95, into the main. A full description of the mechanism by which flow of doubtfully clean water into the aspirator under all conditions is prevented will facilitate explaining the circumstances making that result possible. The assembly of upper discharge pipe portion 39 and post 42 with yoke 40 and riser 38 to complete a firm frame structure has been described.

Best seen in Fig. 4, an assembly comprising a flexible pipe 136 connects the upper pipe portion 39 with the aspirator top neck 135 through an upper larger rigid pipe 137 connected to the lower end of the flexible pipe, and a lower smaller pipe length 138 sliding closely in larger pipe 137, preferably making water-tight connection merely by closeness of fitting. Slight leakage here is not critical. The pressure is only that of the head of water up to the outlet of the discharge pipe; and such leakage as may occur only slightly reduces the efficiency of expulsion by the aspirator. The flexible pipe 136 is conveniently and reliably the well known helically formed metallic pipe or tube.

The bottom end of the lower smaller pipe 138 is simply faced flat to seat on a gasket ring 139 fitted on an annular shoulder 140 within an upstanding annular flange 141, these being parts of the top end of aspirator neck 135. The flange flares upwardly as a guide for the pipe 138 in reaching its seat 139, as best seen in Fig. 14. Posts 142 stand up from the rim of the aspirator neck 135 at one side, with bearings in their tops for the horizontal shaft 143. Shifter arms 144 are fixed on this shaft at the outer sides of the respective bearings. These arms straddle the slidable pipe length 138 and at its opposite side a pin 145 in ears 146 of the pipe length 138 pivotally connect this length to the arms. So, if shaft 143 is turned over to the left, as shown in the drawings, it will by arms 144 lift pipe length 138 from its seated connection with the aspirator and swing it aside to a position best indicated by the broken circles at S in Fig. 7, where the bottom plate 9 is open for dropping of the discharge pipe water directly into reservoir 1.

The bottom edges of the pipe length 138 follow the paths indicated by the broken arcs in Fig. 14, avoiding collision with the upper projection of aspirator discharge tube 134. As flexible pipe 136 is not a pivot or hinge simply, and as the sliding pipe portion 138 enters into the movement, this is not easily calculated and has been found by trial; calling for close copying of the pivot locations in Fig. 14. It will be noted that the separation of the pipe portion 138 from the aspirator is well below the top of the discharge tube or nozzle 134. This is for reasons later to be explained. It happens that the aspirator, a well known product as before noted, has this disposition of its tube 134; and it is the policy to make no more changes than are essential, in adapting this aspirator to the present construction. Thus both requirements are satisfied.

A post on the rim of control cylinder 90 has at its top a bearing for shaft 143 extending over the cylinder from the aspirator. Between this bearing and the aspirator is a crank arm 147 fixed on shaft 143, swung down when the discharge pipe is swung aside. The rod 99 of plunger 94 extends up past an arm 148 of yoke 40, to be guided in a bearing 149 on the arm. Below, a head 150 embraces the rod 99 and is clamped to the rod by set screw 150'. A tubular weight member 152 surrounds and is guided by riser 38, below yoke 40. Out past bearing 149 a fulcrum link 153 is pivoted to and depends from the yoke and has pivoted to its lower end one end of weight lever 154. The other end of lever 154 is a fork the members of which straddle the upper reduced end part of weight member 152 and are connected thereto by pivots 155'. Nearer to the fulcrum than to the weight, the link 156 is pivoted to and depends from lever 154, with its bottom end pivoted to head 150, along with the upper end of a connecting rod 157, the bottom end of which is pivoted to the free end of crank arm 147 on shaft 143, as was noted. Thus, the arms 144 and the plunger 94 are actuated in unison by the weight member 152.

With the aspirator operating, the speed of the unfresh reservoir water and the impelling fresh jet water upward in the discharge pipe is very considerable. Pipe portion 138 is shifted each time the aspirator is stopped in normal operation, simply for quick emptying of the discharge pipe. Vacuum in the main then, even if the discharge pipe residue is returning, presents no problem, because the pipe has been shifted. But with the aspirator operating, the discharge pipe is joined to the aspirator, and must be shifted. Control valve 95 is open and so is auxiliary valve 107 at its top end. This admits full atmospheric pressure from the casing 8, which is vented as later described, acting to depress plunger 94 and seat control valve 95 and to shift the discharge pipe from its connection to the aspirator. It must do this before any of the water above the joint can lose its momentum and start backflow down into the aspirator.

Loss of this momentum is hastened by the atmospheric pressure at the discharge pipe spout 26. But as soon as the plunger 94 under the atmospheric pressure just noted, and the weight member 152, lift pipe portion 138 very slightly from its seat 139, air enters from the casing 8 under the water above the joint and opposes its pressure to that up at the spout 26. The discharge pipe water then is, except for friction, which is not critical, a body freely moving by its momentum. The upwardly extended aspirator tube or nozzle 134 here has its function in that the vacuum in the main cannot directly coact with the casing air appreciably to draw this air downward into the aspirator, as the casing air has to pass upward to the top entrance into aspirator nozzle 134 for this coaction, and in so doing will partake of the upward movement of the water from this tube or nozzle 134; so that practically all of this casing air will pass upward to offset the pressure at spout 26 as above noted, as long as the pipe 138 still surrounds nozzle 134.

All of these actions are of durations of only fractions of a second, but the net margin is sufficient for shifting the discharge pipe before there is significant dissipation of the momentum of the discharge pipe water, insuring against its entering the aspirator whence it can be drawn past control valve 95 if it is faulty, into the main or the connections from the main to the aspirator.

The water from the main, when as usual its pressure is not impaired, having to escape through the small jet nozzle 132 of the aspirator, backs up enough pressure on the control device plunger 94 very effectively to resist weight member 152 to hold control valve 95 open and hold the discharge pipe length 138 firmly to its seat 139 to make a secure joint with the aspirator for normal operation. It is notable however, referring to Fig. 14, that the pressure of the arms 144 at the pin 145 is not on a line through the center of pipe length 138, so that there can be a slight tendency to tilt this pipe length 138 to the right, lessening the pressure on seat 139 in the left hand area. Also, the flexible pipe 136 can permit the pipe lengths 137 and 138 to swing in any direction. The arms 144 can determine the direction correctly if the bearings are very closely fitted, but it is undesirable to rely upon this condition being maintained. For definitely avoiding the above slight defects, a guide and stop member, as seen in Fig. 4, has a hub 158 surrounding the post 42, held by a set screw 159, and a pair of guide arms 160 straddling the upper outer pipe length 137.

The guide arms 160 thus limit the pipe length swinging to the only desired direction; and they also resist the structure in case of tendency of the flexible pipe 136 to buckle as pipe length 138 is lifted by arms 144 in length 137, due to friction between the lengths. With the flexible pipe of adequate size and strength, the buckling tendency is almost negligible. Of course I am not limited either to the guide means or to such a reliable pipe. The stop function of the member 157 is of importance in that the crotch of its two arms 160, at 161, engaged by pipe length 137, will prevent the above mentioned tilting and insure even distribution of seating pressure of the end of pipe length 138 on the gasket ring 139.

Toward any disposition to regard the provisions against contamination in case of vacuum in the main as involving more than necessary consideration, in view of the rare circumstance, not only of vacuum in the main but coincident operation of the aspirator, it is to be observed that apparatus of the character here presented has its use as for supplying railroad trains and other carriers; or with modifications of its upper parts, as public drinking fountains; or other uses attended by presence of large numbers of people augmenting the risk of dangerous contamination by them, and making the more significant any chance for contamination to reach the potable water or parts contacted by it. The reservoir water, even with the effective provision for excluding ground water from it, is open to the atmosphere necessarily at some place, for venting, above noted and exemplified later. The water may stand in the reservoir for long periods between uses of the apparatus. Even some small deposit in this water, of germs or the like, can develop a serious pollution, endangering the health of the great number of users. Therefore, even the rare chances above mentioned cannot logically be ignored. Though the considerations involved are complicated, the actual construction is fairly simple. Shifting of the discharge pipe structure for quick emptying of the discharge pipe has ample reason, even were the precaution in view of possible vacuum in the main ignored. Moreover, the combination and arrangement, in general, of the parts of the apparatus, permitting it to be very compact and therefore relatively small and light and therefore of minimum cost for material and for handling, more than offset whatever special provisions are needed for the special precautions; and the avoidance of use of rubber or the like, and of springs, as much as herein is disclosed, also has this effect, especially as to reliability and ease of maintenance. These are results contributing to a greater degree of sanitation, as will readily be understood.

Referring again to Figs. 1, 2 and 3 for the upper part of the apparatus, the continuity of the discharge pipe from the aspirator to the terminal spout 26, will be understood from previous explanation. By having spout 26 an ample distance up from basin 16, the chance of entrance to the discharge pipe and thence to the reservoir 1 and the aspirator, of pollution that can back into the basin from the sewer or the like to which it is connected, is substantially eliminated.

The riser 38 is reinforced by fitting snugly in the opening 27 where it passes through the floor of lower portion 19 of shell 18, a considerable distance down from its threaded connection to spout conduit 30, relieving the threads of strain that would be imposed by the riser participating in the structural functions previously explained, as with yoke 40 and post 42.

The main valve operating rod 51, central of riser 38, extends up through a stuffing box 162 in the top of spout conduit 30, and has screwed onto its top end, at 163, top member 164, like a bolt with its head 165 down. This member 164 has an axial bore up through its top end, receiving a guide pin 167 fixed in and depending from hub 168 on the lower side of the top of housing 34. Head 165 supports the main valve spring 169, which is helical and so surrounds the head 165 as to be sustained against buckling, and has its top end stationed by hub 168 which the spring also surrounds. The screws 35 are made amply long to serve for drawing down the cover and compressing the spring 169, in assembly.

The operating lever 170 comprises the handle 171 and the fork members 172 straddling housing 34 and each with a square hole in its end part. Cylindrical bearing bushings 173 turn in the housing walls, with square holes, while inside the housing between these bushings is the crank arm 174 with a square hole through its hub. At one side, the top flange 32 of the shell has a small lug 175 extending in under the hub of this arm 174; the hub having a segmental downward extension 176 next to this lug when arm 174 is in the position illustrated. The square shaft 177 is extended through the square holes of the fork members, the bushings and the crank arm so that all turn together. Pins 178 pass through the outer end extensions of this shaft. The bushings 173 have annular flanges 179 inside the housing between its respective walls and the crank arm 174; so that these with pins 178 prevent axial sliding of shaft 177.

Down in the shell upper part 19 a lever 180 extends from its fulcrum 181 up under flange 32 at the left end as shown, across to the right to have a ring part 182 surrounding head 165 of operating rod top member 164, which has trunnions 183 engaging in this ring part 182. A toggle comprises upper bell crank link 184 fulcrumed on lever 180 about midway of its length, with a short arm 185 at the left and a long arm 186 depending to connect pivotally with a second lower link 187 having its bottom end pivoted to a lug 188 upstanding from the floor of shell portion 19 and having a left extension 189 to be engaged by a left extension 190 of the lower toggle link 187. A link 191 connects crank arm 174 to the upper short arm 185 of upper toggle link 184.

These parts are so proportioned and arranged that when main valve 49 is down and closed as shown, the toggle is broken to the right, Fig. 3, and the operating lever 170 is turned to the left with its handle 171 to left of but slightly above plane of the top of housing 34. Crank arm 174 and upper toggle link short arm 185 incline downward to the left. Pulling operating lever 170 up to the right to approximately vertical position sets the toggle slightly to the left of alinement of its links, as limited by engagement of link lug 190 with floor lug 189. This holds spring 169 compressed and main valve 49 up from its seat and open while the operator is attending to disposal of the water then flowing from the apparatus. Swinging operating lever 170 to the left breaks the toggle, freeing spring 169 to close valve 49. In this action, the water pressure in the main resists spring 169; but it is well for the operator to retain grasp on lever handle 171, as too sudden closing of valve 49 may cause water hammer in the connections supplying water to the apparatus. Of course spring 169 has to be amply strong to hold the main valve seated firmly, effectively to prevent leakage of the valve.

When access is to be had to the mechanism just described, requiring removal of cover 33 and with it housing 34 from shell upper part 19, the square shaft 177, after removing one of its pins 178, is axially withdrawn, so that handle lever 170 is incidentally detached, and the rest of the mechanism down in part 19 is left intact. The lug 175, engaging the segmental extension 176 of the hub of crank arm 174, holds this crank arm up so that when cover 33 is restored to position, it is alined for ready insertion of shaft 177. Lug 195 is to left of vertical center line of crank arm turning, to prevent swinging of arm 174 out of place to left as then supported by its link 191, yet so the lug 174 does not interfere with turning of the arm 174 after reassembly.

With all of the provisions against pollution in the lower structure that have been described, there remains the main spout 31 with its threads 31' and lips 31'' onto which a hose coupling is applied in the usual procedure. If these elements have received some portion of pollution, the latter will be squeezed from between the abutting threads and abutting lips of the coupling and the spout, into the interior of the hose, to be taken up by the water being delivered. Previously a cap has been provided simply to slip onto the spout 31 over the parts 31' and 31'', of rubber or like material. This is inadequate in that such material is abraded by the threads 31' and soon becomes ill fitting, in addition to the deterioration of the material and the effects simply of handling the cap to remove and replace it. The improvement here is in the use of metal, or like durable material, in a cap 192 that is a replica of the hose coupling, as concerns its threads and lip portions coacting with the threads and like portions of the spout; to be screwed onto the spout as securely as is the hose coupling when a hose is being used with the apparatus.

This cap 192, having peripheral ribs 193 grasped for turning it, has its central journal pin 194; and a bracket 195 has an arm 196 on the end of which is a bearing 197 in which pin 194 connects the cap rotatably to the bracket. Under the junction of the spout 31 with the shell 18 is a recess 197 with side outward extensions 198. A bar 199 fits snugly between these extensions 198 with a pivot pin 198' through it and the extensions, so that this bar 199 can swing up and down under the spout 31 in the vertical plane of the spout. Into recess 197 from the part of the bar that receives the pivot extends a toe 200 shaped to engage the bottom of recess 197. Above the toe a helical spring 201 is held between the toe and the top of the recess as seen in Fig. 3. The bracket 195 is a hollow block snugly slidable on bar 199 which has a head 199' down against which bracket 195 slides when bar 199 and cap 192 are swung down. Being of rectangular cross section the bar and the interior of the bracket hold arm 196 up so that when the bar is stopped by toe 200 engaging the recess bottom, the cap 192 is axially alined with the spout threads. Of course the relation still lacks registering of the cap and spout threads.

This structure will be held down by the hose once it is attached to the spout; but while the operator is making the attachment, and when he must detach the hose, the structure obtrudes enough to be in his thought sufficiently to remind him to place the cap on the spout. So reminded he is not likely to neglect the placing deliberately. Operators are, however, tempted to derange the spring that causes the obtrusion; and mounting spring 201 in the constricted recess 197 makes this derangement difficult, at least without special tools.

Were the cap 192 hurriedly screwed onto the spout 31, it would prevent venting for drainage of the riser. But when the operator unscrews the hose he must dispose the end of it safely, somehow; and then, though cap 192 is alined with the spout threads, he must push the cap to the threads and turn it so that the two sets of threads are matched for screwing together, as above mentioned. These necessary acts of the operator are mentioned to indicate that there is ample delay in stopping the vent the spout affords, so that all the water will have drained from the riser into the reservoir several seconds before air is fully excluded from the spout by the tightened cap. This especially is true if the operator has been informed of the propriety of unhurried action so as to leave the vent an amply long while. Thus no substitute vent is needed, and not only are the spout threads covered against pollution, but the riser is closed against entrance of dust, insects and other impurities during the interval until the next use of the apparatus.

It will be observed that when the water is coming from the riser to increase the quantity in the reservoir, the discharge pipe with its pipe portion 138 swung aside is fully open, and acts as the vent for the air displaced by the added water in the reservoir. But for the discharge of reservoir water by the aspirator and the reception of the residue from the discharge pipe after this discharge, special venting is needed, since the riser has been closed by spout cap 192. So, in a wall of top housing 34, is a tube 202 extending out with a taper to end in an annular knife edge; and a hood 203 on the outer side of the wall covers tube 202 at top, sides and outer end, and has its lower edges 204 but slightly spaced up from the top surface of cover disk 33. The thin end edge of tube 202 makes it more difficult for insects to get into the apparatus through this tube, aided in this by the baffle hood 203; and the hood 203 baffles driving rain which might get into tube 202 and freeze upon the rare occurrence of freezing weather immediately after the rain. So that the air admitted by this vent tube 202 may reach the reservoir, the floors of the upper shell portions 28 and 19 have openings 205 and 206, respectively. The successive capacities of housing 34 and shell portions 28 and 19 therefrom to casing 8 and thence to the reservoir 1 afford very effective baffling means for the impurities that could get in through tube 202 and lodge in reservoir 1; being scattered throughout these large capacities largely instead. The reservoir water of course is not regarded as pure; but it is desirable to keep it as clean as possible, especially as such foregoing substances can settle at the reservoir bottom and could clog the entrance of the float guard at the bottom, and the entrance to the suction pipe 75 ended very close to said bottom.

A review of the operation of the apparatus will indicate how well it meets the present very exacting requirements of water service apparatus with the least need of special instructions to operators who have not been used to giving special attention under previous more lax requirements, so that it is not practicable to imposed discipline to obtain such attention.

Spout cap 192 is simply unscrewed and moved aside and held there with one hand while applying the cap to the spout with the other. Then with the hose controlled, operating lever 170 is pulled up, opening main valve 49 and closing drain valve 68, for outflow of the potable water from spout 31. At this time the reservoir contents is the residue that came from the discharge pipe at ending of the last previous aspirator operation. When the desired amount of potable water has been obtained, operating lever 170 is pushed down, closing main valve and opening drain valve 68, allowing the riser residue to flow into and increase the contents of the reservoir. This occurs while the spout vent is left while the operator is readying to screw cap 192 onto spout 31 as before explained; reminded to do this by obtrusion of cap 192 when he was applying the hose, and now when he has removed the hose.

The increased amount of water in the reservoir raises float 78 until it tilts rocker 120 and depresses auxiliary valve 107, releasing the water from above control plunger 94. The water from the main, acting first on control valve 95 and then on plunger 94, with its pressure backed up by the constricted outlet in the aspirator, raises weight member 152 and sets the aspirator in operation; the discharge pipe portion 138 having been rejoined to the aspirator in this action. The entire contents of the reservoir now is expelled through the drain pipe and its spout 26, out into the basin 16. Float 78 has descended accordingly and tilted rocker 120, raising auxiliary valve 107 and closing the outlet from above plunger 94 but admitting water from the main through by-pass port 113 to the space above plunger 94 which, aided by weight member 152, closes control valve 95 very quickly, stopping the aspirator and swinging drain pipe portion 138 out so that the discharge pipe drains quickly into reservoir 1. Thus the cycle is completed without the operator's attention since he pushed the lever 170, removed the hose and replaced cap 92 on spout 31.

When drain pipe length 138 is swung off of the aspirator, sliding upward, it exposes the lower part of the column of undesired water in the discharge pipe, and that still spurting from the aspirator discharge tube 134. These waters however have their momentum notwithstanding they are exposed; and they simply splash out upon the adjacent devices and run down onto bottom plate 9 and from it into the reservoir. They tend to wash the surfaces of these parts. For such reasons plate 9 is not made continuous nor made water tight in any special degree with the reservoir neck 2.

It is noted that the float 78 simply is stopped by auxiliary valve 107 through engagement of float lower dog 127 with rocker finger 123; merely causing auxiliary valve 107 to seat downwardly the firmer, to keep the aspirator working the more certainly to expel all of the water; it of course being highly necessary that reservoir water never should rise to the drain valve 68 and into the riser barrel 36 past the valve. There always is the contingency that main valve 49 may leak slightly after some use; and the leakage must escape to the reservoir past open drain valve 68. Even a drop by drop leakage in a long interval between uses of the apparatus can cause such water to build up in the riser 38 a column reaching freezing height. The reservoir therefore has the extra capacity for this leakage. Also, if the distance of the parts below ground level is greater, the longer riser and discharge pipe, draining larger residues to the reservoir require it to have greater capacity. Whether this is attained by deepening or widening the reservoir, the float mechanism is adjusted accordingly.

The compactness and moderate size and weight of the entire apparatus is indicated by saying that the casing 8 may be a standard steel pipe of six inch nominal size, with actual inside diameter only 6.065 inches. The compactness is attained by placing the riser, instead of as is usual at the center of the casing of such a device, at one side, allowing a crescent shaped space instead of a narrow annular space in which can be arranged all of the other devices that would not be admitted by the narrow annular space. Also, since for making screw connection between the riser and the main, the incident advantage of a central riser is sacrificed to attain the compactness, the distributing conduit 10 with the screw connection to central pipe 7 is a contributing element to the two advantages, compactness and secure and reliable screw connection.

Briefly reviewing the advantages attained by my present improvement, the regrouping of parts permits an apparatus that is very much more compact and therefore smaller for a given duty, and so lighter, saving material, and saving labor in handling, with no remarkable increase in labor for construction. By the substitution of weight-operating devices for spring-operating devices, and tapered screw thread connections for connections involving rubber or the like, labor of maintenance is saved, and the maintained sanitary and working condition is less dependent upon the thoughtfulness of operators. Not only is a gravity-acting device free of breakage of springs; a spring reduces its force as it expands, whereas a weight falls the faster the longer it falls. Springs and rubber or the like are not so objectionable above the ground level, as they may be replaced without hauling the apparatus up from the ground; and a spring can be more compact than an equivalent weight device and thus more suitable above ground level, where vertical extent is more limited. The gasket cup of plunger 94 may be of leather or some composition having leather-like properties, and such material is not as subject to deterioration as is rubber or like material. The gasket seat 139 for the separable discharge pipe may be of rubber or the like safely; as the water pressure is light, and some leakage at the joint is not critical. The gasket rings of the valve members are massive, relatively, and are dependably of rubber or like material with high elasticity for water tightness.

My apparatus has been disclosed herein amply in detail, but it will be understood that modifications may occur according to needs arising in practice, and that I do not wish to be understood as being limited to such precise disclosure, but

What I claim as new and desire to secure by Letters Patent is:

1. Water service apparatus comprising a reservoir, a riser, water supply means, and means to cause alternative flow from the supply means to the riser and flow from the riser to the reservoir, a water-operated device to remove water from the reservoir, means to conduct water from said supply means to said device including a water-operated valve determining flow of water to said device, means for flow of water from said supply means to said valve, and an auxiliary valve determining said flow by shifting its position, said apparatus also including a tappet moving with said auxiliary valve, a rocker having jaws straddling said tappet and spaced to make delayed engagements with the tappet alternately to shift the auxiliary valve in one direction or the other by rocking in one direction or the other, a float in said reservoir, movable in alternate directions by increase or decrease of water therein, and dogs moving with said float to make delayed operational engagements with the rocker to rock the rocker in one direction or the other, energy storing means operatively related to the rocker, operated by the dog and rocker engagement in each delay of rocker and tappet engagement, to store energy, and then operated by the stored energy to act on the tappet and thence on the auxiliary valve to change the direction of water pressure on the control valve either to operate the water removing device or to leave said device inoperative, whereby the changes are made in relatively short terminal periods of the times of travel of the float in one direction or the other.

2. Water service apparatus as set forth in claim 1, including an upright casing, the reservoir being directly below the lower end of the casing, and in which the riser, the water removing device and the control means are structurally connected as a unit for movement up and down through said casing, and riser, the water removing device and the control device being arranged next to the sides of the casing away from the casing axis, permitting minimum transverse dimensions of the casing and of the apparatus as a whole.

3. Water service apparatus comprising, for the purpose set forth, a pipe structure including, in end to end succession, a rigid pipe, a flexible pipe, a second rigid pipe, and a third rigid pipe sliding endwise of the second pipe, a water forcing device having means to receive the free end of the third pipe for making or breaking connection therewith, swinging means pivoted to said forcing device and to said third pipe, swinging to make or break said connection, and means for swinging said swinging means, said forcing device including a water discharging extension surrounded by said third pipe when the connection is made, said swinging means being so mounted for swinging and so connected to said third pipe as to avoid collision of any wall of said third pipe with said extension.

4. Water service apparatus comprising, for the purpose set forth, a pipe structure including, in end to end succession, a rigid pipe, a flexible pipe, a second rigid pipe, and a third rigid pipe sliding endwise of the second pipe, a water forcing device having means to receive the free end of the third pipe for making or breaking connection therewith, swinging means pivoted to said forcing device and to said third pipe, swinging to make or break said connection, and means for swinging said swinging means, said apparatus also including guide elements straddling said second rigid pipe to guide it in swinging in the absence of definite guidance by the flexible pipe, and a stop element engaged by said second pipe to set said third rigid pipe to said forcing device for effectiveness of the connection.

5. Water service apparatus comprising water supply means, a riser receiving water from said supply means, a reservoir receiving water from said riser, an upright discharge pipe, a forcing device to force water up from said reservoir through said pipe, an upright casing above said reservoir, around said riser, pipe and forcing device, shell structure above said casing with vertically succeeding compartments and a top structure on said shell structure, said top structure and the compartment walls having openings of materially less area than those of the compartments, for passage of venting air from outside the top structure down to the reservoir, the air having foreign substances carried thereby baffled within the compartments, to exclude said substances from the reservoir.

6. Water service apparatus comprising in combination, a hydrant having an outlet for the delivery of water, an upright riser having connection with a source of water under pressure near its lower end, and with the hydrant outlet near its upper end, a main valve in the riser and means for opening and closing said main valve, the valve including a port to drain the riser upon each closing movement of the valve, said port having a valve member associated therewith adapted to close said port when the main valve is open and to open said port when the main valve is closed, a reservoir receiving water drained from the riser through said port, a discharge pipe for conveying drained water from the reservoir to a location exteriorly of the hydrant, an aspirator associated with the discharge pipe for moving the drained water through said pipe, and float controlled means responsive to a changing level of water in the reservoir, for placing the aspirator in operating relationship with the source of water under pressure when the level of water in the reservoir exceeds a predetermined value.

7. Water service apparatus comprising in combination, a hydrant having an outlet for the delivery of water, an upright riser having connection with a source of water under pressure near its lower end, and with the hydrant outlet near its upper end, a main valve in the riser and means for opening and closing said main valve, the valve including a port to drain the riser upon each closing movement of the valve, said port having a valve member associated therewith adapted to close said port when the main valve is open and to open said port when the main valve is closed, a reservoir receiving water drained from the riser through said port, a discharge pipe for conveying drained water from the reservoir to a location exteriorly of the hydrant, said discharge pipe being independent of the riser and having an exterior end disposed at a substantial elevation above the reservoir, an aspirator associated with the discharge pipe for moving the drained water through said pipe, and float controlled means responsive to a changing level of water in the reservoir, for placing the aspirator in operating relationship with the source of water under pressure when the level of water in the reservoir exceeds a predetermined value.

8. Water service apparatus comprising in combination, a hydrant having an outlet disposed above ground level for the delivery of water, an upright riser having connection with a source of water under pressure near its lower end, and with the hydrant outlet near its upper end, a main valve in the riser below ground level, and means for opening and closing said valve to control flow of water from the pressure source through the riser, the valve having a port to drain the riser upon each closing movement of the valve, said port having a valve member associated therewith adapted to close said port when the main valve is open and to open said port when the main valve is closed, a reservoir embedded in the earth and arranged to receive water drained from the riser through said valve port, a discharge pipe having a lower end reaching substantially to the bottom of the reservoir, and an upper end open to atmosphere above ground level exteriorly of the hydrant, and float operated means actuated by a changing level of water in the reservoir, for expelling said water through the discharge pipe when the level of water in the reservoir exceeds a predetermined value.

9. Water service apparatus comprising in combination, a hydrant having an outlet disposed above ground level for the delivery of water, an upright riser having connection with a source of water under pressure near its lower end, and with the hydrant outlet near its upper end, a main valve in the riser below ground level, and means for opening and closing said valve to control flow of water from the pressure source through the riser, the valve having a port to drain the riser upon each closing movement of the valve, said port having a valve member associated therewith adapted to close said port when the main valve is open and to open said port when the main valve is closed, a reservoir embedded in the earth and arranged to receive water drained from the riser through said valve port, a discharge pipe having a lower end reaching substantially to the bottom of the reservoir, and an upper end open to atmosphere above ground level exteriorly of the hydrant, an aspirator associated with the discharge pipe for moving the drained water through said pipe, and float controlled means responsive to a changing level of water in the reservoir, for energizing the aspirator when the level of water in the reservoir exceeds a predetermined value.

10. Water service apparatus comprising in combination, a hydrant having an outlet disposed above ground level for the delivery of water, an upright riser having its lower end below ground level and connected with a source of water under pressure and its upper end connected with the hydrant outlet, a main valve in the riser below ground level, means for opening and closing said valve to control flow of water from the pressure source through the riser, the valve having a port to drain the riser upon each closing movement of the valve, said port having a valve member associated therewith adapted to close said port when the main valve is open and to open said port when the main valve is closed, a reservoir below the ground level and arranged to receive water drained from the riser through said valve port, a discharge pipe having one end extending into the reservoir below the top thereof and its opposite end open to the atmosphere above ground level exteriorly of the hydrant, and float-operated means actuated by a changing level of water in the reservoir for expelling said water through the discharge pipe when the water in the reservoir rises to a predetermined level above the lower end of the discharge pipe.

JOHN T. McGARRY.

REFERENCES CITED

The following references are of record in the file of this patent:

UNITED STATES PATENTS

| Number | Name | Date |
|---|---|---|
| 739,684 | Kehr | Sept. 22, 1903 |
| 824,770 | Williams | July 3, 1906 |
| 841,615 | Brown | Jan. 15, 1907 |
| 1,089,400 | Delany | Mar. 10, 1914 |
| 1,216,815 | Kelly | Feb. 20, 1917 |
| 1,448,972 | Long | Mar. 20, 1923 |
| 1,689,477 | Capers | Oct. 30, 1928 |
| 1,693,095 | Ritchie | Nov. 27, 1928 |
| 1,788,280 | Dempsey | Jan. 6, 1931 |
| 1,837,881 | Modra | Dec. 22, 1931 |

FOREIGN PATENTS

| Number | Country | Date |
|---|---|---|
| 159 | Germany | of 1883 |
| 7,520 | Germany | of 1879 |